V. MATTHEWS.
TRACTOR HITCH.
APPLICATION FILED MAY 14, 1918.
1,336,474.   Patented Apr. 13, 1920.
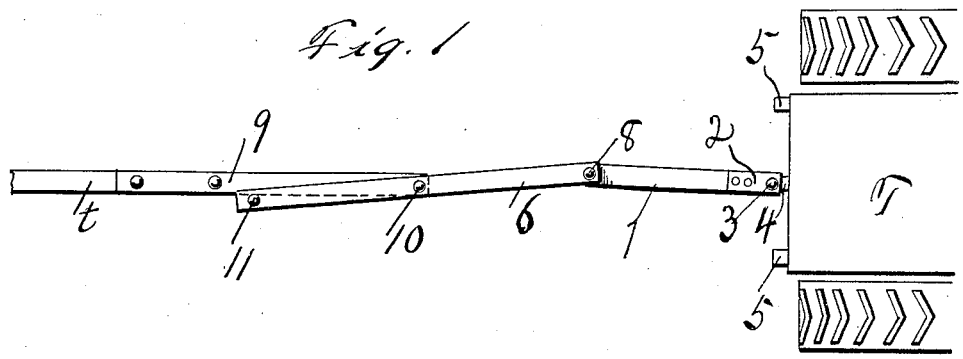
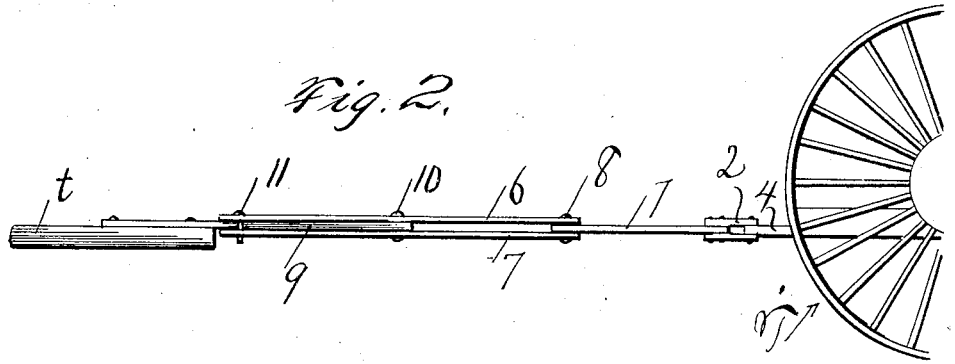
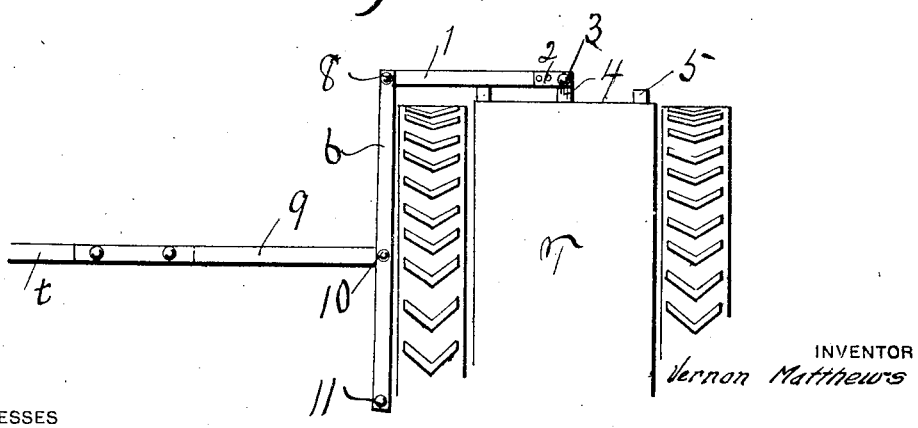
INVENTOR
Vernon Matthews
WITNESSES
BY
ATTORNEY

UNITED STATES PATENT OFFICE.

VERNON MATTHEWS, OF CARTHAGE, MISSOURI.

TRACTOR-HITCH.

1,336,474.
Specification of Letters Patent.
Patented Apr. 13, 1920.

Application filed May 14, 1918. Serial No. 234,527.

*To all whom it may concern:*

Be it known that I, VERNON MATTHEWS, a citizen of the United States, residing at Carthage, in the county of Jasper and State of Missouri, have invented certain new and useful Improvements in Tractor-Hitches, of which the following is a specification.

This invention relates to tractor hitches, and the object thereof is to construct such a hitch so that the tractor in connection with which it is used may turn a square corner thereby requiring a minimum space to effect its turning.

Another object is to provide a hitch for a tractor which will permit the tractor to stop at a corner, back and turn toward the land and then advance at right angles to its former course thereby making it possible to turn square corners.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of a portion of a tractor with this improved hitch applied and arranged for straight pulling action, the tongue of the implement to be drawn being shown connected therewith, Fig. 2 is a side elevation thereof, and Fig. 3 is a plan view showing the position assumed by the hitch in turning a corner.

The hitch constituting this invention is shown applied to a tractor indicated at T and connecting it with the tongue *t* of an implement, not shown, which is to be drawn by the tractor. This hitch is composed of a link or strap 1 of iron or other suitable metal having a clevis 2 riveted to its inner end and pivotally connecting it at 3 with a coupling 4 on the tractor. This tractor is provided at its rear end with longitudinally extending stops 5 disposed on each side of the coupling, and against which the link 1 is designed to rest during the turning of the tractor, as is shown clearly in Fig. 3.

A pair of superposed vertically spaced straps or links 6 and 7 are connected at one end to the free end of link 1, said end being disposed between said straps and pivoted as shown at 8.

A strap 9 is riveted to the front end of the tongue *t* to hold it rigidly connected thereto and its free end is pivotally connected with the superposed straps 6 and 7 at a point about midway their ends as shown at 10. This strap end 9 is disposed between the straps 6 and 7 (see Fig. 2), and the free ends of the straps 6 and 7 are arranged at one side of the strap 9 and held offset therefrom by a removable pin 11. This pin 11 is positioned as shown in the accompanying drawing, when the tractor is to be turned toward the right, and when it is to be turned toward the left, the pin 11 is removed and the free ends of the straps 6 and 7 positioned on the other side of link 9 and the pin again inserted.

In the use of this improved hitch, the tractor T is stopped when the implement which it is drawing has reached the corner of the field. The tractor is then backed and turned toward the land, and then advances at right angles to its former course.

When the tractor turns the hitch bends at the three joints 3, 8 and 10, as shown in Fig. 3, and which is due to the offset caused by the positioning of pin 11. When the hitch is so positioned, the link 1 extends transversely across the back of the tractor while the superposed links 6 and 7 are arranged parallel at one side thereof, the strap 9 remaining stationary. The tractor then advances and swings the implement with which the tongue *t* is connected around as the joints 3, 8 and 10 straighten out into the positions shown in Figs. 1 and 2.

From the above description it will be obvious that this improved hitch will render a tractor practicable for use in small fields, as the turning thereof will require a much smaller space than with hitches heretofore used.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:—

1. A tractor hitch comprising a plurality of pivotally connected iron straps for insertion between a tractor and an implement to be drawn thereby, said straps being connected to pivot and fold around the tractor on the backing thereof to position the implement at right angles to the tractor.

2. A tractor hitch comprising a plurality of pivotally connected iron straps for insertion between a tractor and an implement to be drawn thereby, one of said straps being offset relatively to the others to provide for the folding of the hitch around the tractor on the backing thereof to position the implement at right angles thereto.

3. In a tractor hitch, a strap provided with a clevis at one end for connection to a tractor coupling, said strap being flat face up, a pair of parallel superposed links having their inner ends positioned on the opposite faces of said strap at its outer end and pivoted thereto, another link having one end inserted between said superposed links and pivoted thereto at a point midway their ends, the other end of said inserted link extending beyond the rear ends of said superposed links and adapted to be fixed to the end of the tongue of a vehicle to be drawn by the tractor, the free ends of said superposed links being connected by a removable pin and thereby held offset from said inserted link.

4. The combination with a tractor having a coupling at its rear end with stops disposed on each side of said coupling, a strap having a clevis at one end connected with said coupling, a pair of parallel superposed links having their inner ends positioned on the opposite faces of said strap at its outer end and pivoted thereto, another link inserted between said superposed links and pivoted thereto at a point spaced inwardly from the outer ends of said links, said inserted link extending beyond the rear ends of said superposed links and adapted to be connected to a vehicle to be drawn, a removable element connecting the free ends of said superposed links, the first-mentioned strap being designed to engage one of said stops when the strap is positioned transversely of the tractor.

5. The combination with a tractor and the tongue of an implement to be drawn thereby; of a strap pivotally connected at one end to the rear end of the tractor to swing in a horizontal plane, another strap fixed at one end to said tongue and extending longitudinally in advance thereof, a pair of superposed straps arranged one on one face and the other on the other face of the free end of said tractor connected strap and pivoted thereto to swing in a horizontal plane, the free end of said tongue carried strap being located between said superposed straps and pivoted thereto intermediately their ends, and a removable pin extending through the free ends of said superposed straps to engage one side edge of the tongue carried strap.

In testimony whereof I affix my signature in presence of two witnesses.

VERNON MATTHEWS.

Witnesses:
E. L. CRAWFORD,
ARTHUR L. TEETER.